(12) United States Patent
Wu et al.

(10) Patent No.: US 10,417,164 B2
(45) Date of Patent: Sep. 17, 2019

(54) SYNCHRONOUS TRANSMISSION DEVICE AND SYNCHRONOUS TRANSMISSION METHOD

(71) Applicant: ASMedia Technology Inc., New Taipei (TW)

(72) Inventors: Chin-Lung Wu, New Taipei (TW); Wei-Yun Chang, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 0 days.

(21) Appl. No.: 15/848,553

(22) Filed: Dec. 20, 2017

(65) Prior Publication Data

US 2018/0189220 A1 Jul. 5, 2018

Related U.S. Application Data

(60) Provisional application No. 62/439,906, filed on Dec. 29, 2016.

(30) Foreign Application Priority Data

Sep. 28, 2017 (TW) .............................. 106133443 A

(51) Int. Cl.
*G06F 13/42* (2006.01)
*G06F 13/28* (2006.01)
(Continued)

(52) U.S. Cl.
CPC ........ *G06F 13/4217* (2013.01); *G06F 13/287* (2013.01); *G06F 13/385* (2013.01);
(Continued)

(58) Field of Classification Search
CPC .. G06F 13/4217; G06F 13/287; G06F 13/385; G06F 13/4022
(Continued)

(56) References Cited

U.S. PATENT DOCUMENTS 5,933,611 A * 8/1999 Shakkarwar .......... G06F 13/385
710/100
6,708,247 B1 * 3/2004 Barret ................. G06F 13/4286
710/300
(Continued)

FOREIGN PATENT DOCUMENTS

| CN | 100576192 C | 12/2009 |
|---|---|---|
| TW | 201013416 A | 4/2010 |
| TW | I337307 | 2/2011 |

*Primary Examiner* — Farley Abad
*Assistant Examiner* — Henry W Yu
(74) *Attorney, Agent, or Firm* — McClure, Qualey & Rodack, LLP

(57) ABSTRACT

A synchronous transmission device includes a first communication port, a first bus instance and a second bus instance. The first communication port is connected to the first endpoint and the second endpoint. The first bus instance executes a first data transmission with the first endpoint according to a first node of a first schedule list. The first node corresponds to the first endpoint, and the first bus instance corresponds to the first communication port. When the first data transmission is executed, the first bus instance is further configured to determine whether the second bus instance is idle. When the second bus instance is idle, the first bus instance controls the second bus instance to execute a second data transmission with the second endpoint according to a second node of the first schedule list. The second node of the first schedule list corresponds to the second endpoint.

10 Claims, 3 Drawing Sheets

(51) Int. Cl.
  *G06F 13/38*  (2006.01)
  *G06F 13/40*  (2006.01)
(52) U.S. Cl.
  CPC .. *G06F 13/4022* (2013.01); *G06F 2213/0042* (2013.01); *G06F 2213/4004* (2013.01)
(58) Field of Classification Search
  USPC ................................ 710/100, 300, 313, 308
  See application file for complete search history.

(56) References Cited

U.S. PATENT DOCUMENTS

| | | | |
|---|---|---|---|
| 7,769,941 B2 | 8/2010 | Huang et al. | |
| 8,521,934 B1 | 8/2013 | Ni | |
| 2003/0005197 A1* | 1/2003 | Abramson | G06F 13/387 |
| | | | 710/300 |
| 2004/0073721 A1 | 4/2004 | Goff et al. | |
| 2008/0005445 A1* | 1/2008 | Diefenbaugh | G06F 13/385 |
| | | | 710/313 |
| 2009/0150582 A1* | 6/2009 | Diefenbaugh | G06F 13/385 |
| | | | 710/100 |
| 2011/0170433 A1* | 7/2011 | Scobbie | H04L 43/0829 |
| | | | 370/252 |
| 2012/0089864 A1* | 4/2012 | Tanaka | G06F 11/201 |
| | | | 714/5.1 |
| 2018/0062992 A1* | 3/2018 | Cohn | H04L 45/74 |

* cited by examiner

SYNCHRONOUS TRANSMISSION DEVICE AND SYNCHRONOUS TRANSMISSION METHOD

CROSS-REFERENCE TO RELATED APPLICATION

This application claims the priority benefit of U.S. provisional application Ser. No. 62/439,906, filed on Dec. 29, 2016 and TW application serial No. 106133443, filed on Sep. 28, 2017. The entirety of the above-mentioned patent applications are hereby incorporated by references herein and made a part of specification.

BACKGROUND OF THE INVENTION

Field of the Invention

The invention relates to a synchronous transmission device and a synchronous transmission method.

Description of the Related Art

As for multiple endpoints connected to a same communication port, data of endpoints are transmitted sequentially according to a scheduled list. That is, after one data transmission is finished, next data transmission would be started. Therefore, the efficiency of data transmission is low.

BRIEF SUMMARY OF THE INVENTION

According to an aspect of the disclosure, a synchronous transmission device is provided. The synchronous transmission device comprises: a first communication port, connected to a first endpoint and a second endpoint; a first bus instance, executing a first data transmission with the first endpoint according to a first node of a first schedule list, wherein the first node of the first schedule list corresponds to the first endpoint, and the first bus instance corresponds to the first communication port; and a second bus instance, when the first data transmission is executed, the first bus instance is further configured to determine whether the second bus instance is idle, when the second bus instance is idle is determined, the second bus instance is controlled to execute a second data transmission with the second endpoint according to a second node of the first schedule list, and the second node of the first schedule list corresponds to the second endpoint.

According to another aspect of the disclosure, a synchronous transmission method is provided. The synchronous transmission method comprises: executing a first data transmission with a first endpoint via a first bus instance according to a first node of a first schedule list, wherein the first node of the first schedule list corresponds to the first endpoint; determining whether a second bus instance is idle via the first bus instance when the first data transmission is executed; and controlling the second bus instance to execute a second data transmission with a second endpoint according to a second node of the first schedule list when the second bus instance is determined as idle via the first bus instance, wherein the second node of the first schedule list corresponds to the second endpoint, a first communication port is connected to the first endpoint and the second endpoint, the first bus instance is configured corresponding to the first communication port.

In sum, when the data transmission of an endpoint is executed, the synchronous transmission device 100 uses the idle bus instance to execute data transmission with another endpoint according to a schedule list. Therefore, an effect of synchronous transmission is achieved, and the efficiency of data transmission is also improved.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

When a component is "connected" or "coupled" to another component, it represents that the two components are "connected" or "coupled" with or without other component(s) therebetween. When a component is "directly connected" or "coupled" to another component, no components is existed between the two components.

The description of "the first", "the second" and so on are not used to limit the order. They are only used to distinguish components or operations with same technical terms, but not used to limit the invention.

Figure 1:
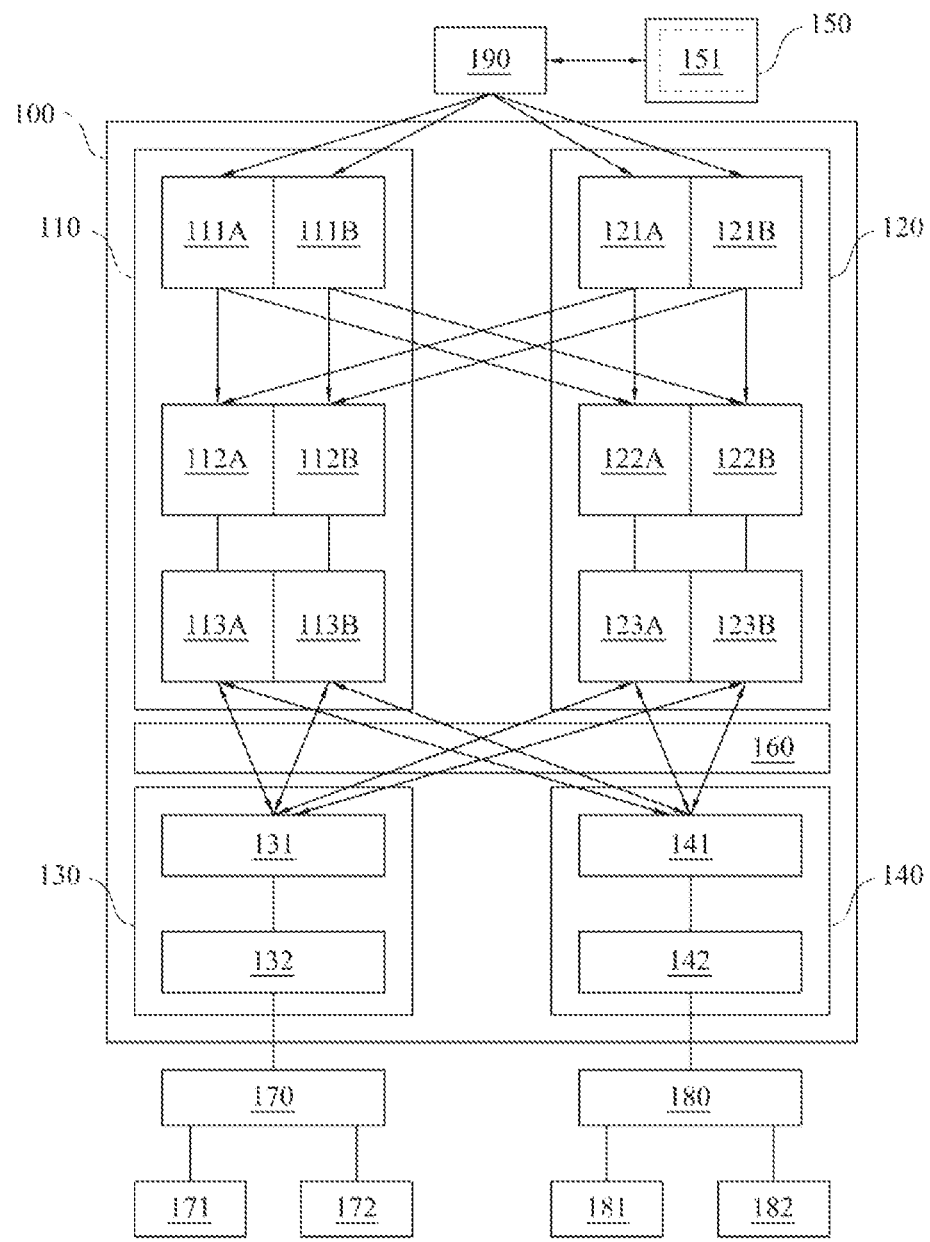
FIG. 1 is a schematic diagram of a synchronous transmission device in an embodiment.

FIG. 1 is a schematic diagram of a synchronous transmission device in an embodiment of the present disclosure. A synchronous transmission device 100 includes a first bus instance 110, a second bus instance 120, an arbitration unit 160, a first communication port 130 and a second communication port 140. The first bus instance 110 is configured corresponding to the first communication port 130 and the second bus instance 120 is configured corresponding to the second communication port 140.

The numbers of the first bus instances 110, the second bus instances 120, the first communication ports 130 and the second communication ports 140 shown in FIG. 1 are various according to requirement. In an embodiment, the synchronous transmission device 100 includes multiple communication ports and multiple bus instances. The number of the communication ports is equal to that of the bus instances.

In an embodiment, the first bus instance 110 includes first schedulers 111A, 111B, first direct memory access (DMA) units 112A, 112B and first protocol units 113A, 113B. The first direct memory access unit 112A is connected to the first protocol unit 113A. The first direct memory access unit 112B is connected to the first protocol unit 113B. The second bus instance 120 includes second scheduler 121A, 121B, second direct memory access units 122A, 122B and second protocol units 123A, 123B. The second direct memory access unit 122A is connected to the second protocol unit 123A. The second direct memory access unit 122B is connected to the second protocol unit 123B.

In an embodiment, the first scheduler 111A is an output scheduler. The first scheduler 111B is an input scheduler. The first direct memory access unit 112A is an output direct memory access engine (DMA engine). The first direct memory access unit 112B is an input direct memory access engine. The first protocol unit 113A is a transfer protocol unit. The first protocol unit 113B is a reception protocol unit. Similarly, the second scheduler 121A is an output scheduler. The second scheduler 121B is an input scheduler. The second direct memory access unit 122A is an output direct memory access engine. The second direct memory access unit 122B is an input direct memory access engine. The second protocol unit 123A is a transfer protocol unit. The second protocol unit 123B is a reception protocol unit.

In an embodiment, the first schedulers 111A, 111B, the first direct memory access units 112A, 112B, the second schedulers 121A, 121B and the second direct memory access units 122A, 122B operate according to the extensible host controller interface (xHCI). The first protocol units 113A, 113B, the second protocol units 123A, 123B, and the arbitration unit 160 operate according to the Universal Serial Bus protocol (USB 3.1 protocol). In an embodiment, the arbitration unit 160 is an arbitrator.

In an embodiment, the first communication port 130 includes a link port 131 and a root port 132. The second communication port 140 includes a link port 141 and a root port 142. The link ports 131, 141 are at a data link layer. The root ports 132, 142 are at a physical layer. The root port 132 of the first communication port 130 is connected to a first endpoint 171 and a second endpoint 172 via a hub 170. The root port 142 of the second communication port 140 is connected to a third endpoint 181 and a fourth endpoint 182 via a hub 180. The first endpoint 171 and the second endpoint 172 are the same device or different devices in embodiments. The third endpoint 181 and the fourth endpoint 182 are the same device or different devices in embodiments. In an embodiment, the hubs 170, 180 are USB 3.1 hubs. The first endpoint 171, the second endpoint 172, the third endpoint 181 and the fourth endpoint 182 are USB 3.1 devices or USB 3.0 devices.

Figure 2:
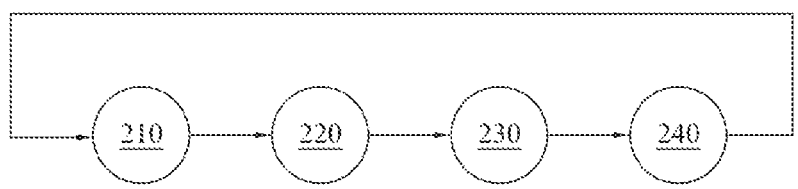
FIG. 2 is a schematic diagram of a first schedule list in an embodiment.

In the embodiment, the synchronous transmission device 100 outputs data to the first endpoint 171 and the second endpoint 172. Please refer to FIGS. 1 and 2. FIG. 2 is a schematic diagram of a first schedule list 200 in an embodiment of the present disclosure. The first schedule list 200 includes a first node 210, a second node 220, a third node 230 and a fourth node 240. The first node 210 and the third node 230 correspond to the first endpoint 171. The second node 220 and the fourth node 240 correspond to the second endpoint 172. That is, the two adjacent nodes in the first schedule list 200 correspond to different endpoints respectively. In an embodiment, the first node 210 and third node 230 represent communications or the operations with the first endpoint 171. For example, the first node 210 of the first schedule list 200 represents data transmission to the first endpoint 171 (such as a USB 3.1 device or a USB 3.0 device). The second node 220 of the first schedule list 200 represents data transmission to the second endpoint 172 (such as a USB 3.1 device or a USB 3.0 device), which is not limited herein. In an embodiment, a firmware 151 is stored in a memory 150 (such as a program random access memory). A central processing unit (CPU) 190 executes the firmware 151 to configure the two nodes corresponding to the first endpoint 171 and the second endpoint 172 adjacently to generate the first schedule list 200. As shown in FIG. 1, the first endpoint 171 and the second endpoint 172 correspond to different connection paths.

In an embodiment, the first communication port 130 is connected to multiple endpoints (such as the first endpoint 171 and the second endpoint 172, which is not limited herein). The CPU 190 executes the firmware 151 to generate the first schedule list 200 according to the endpoints. In an embodiment, the CPU 190 executes the firmware 151 to configure two nodes corresponding to two of these endpoints as adjacent nodes to generate the first schedule list 200.

Figure 4:
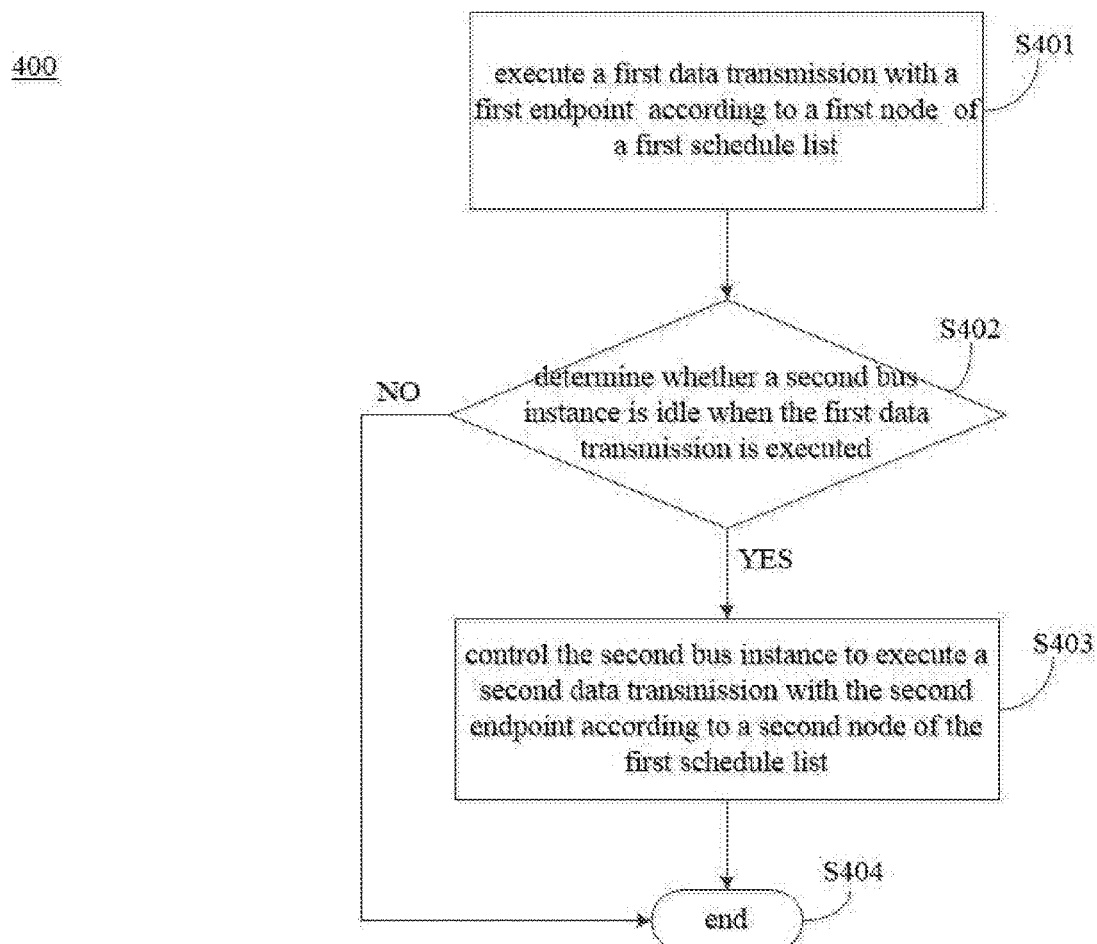
FIG. 4 is a flow chart of a synchronous transmission method in an embodiment.

Please refer to FIG. 4. FIG. 4 is a flow chart of a synchronous transmission method 400 in an embodiment of the present disclosure. The synchronous transmission method 400 includes multiple steps S401~S404. It can be applied to the synchronous transmission device 100 shown in FIG. 1. In practice, unless specifically stated, the sequence of the steps can be adjusted, or some steps can be executed simultaneously.

In step S401, the first bus instance 110 executes a first data transmission with the first endpoint 171 according to the first node 210 of the first schedule list 200. That is, the first data is transmitted to the first endpoint 171. In an embodiment, the first scheduler 111A controls the first direct memory access unit 112A to access data from the memory (not shown) according to the first node 210 of the first schedule list 200. Furthermore, the first scheduler 111A controls the first protocol unit 113A to process the data into packets according to the transfer protocol of the host. The packets are transferred to the first endpoint 171 via the arbitration unit 160 and the first communication port 130. Then, the first data transmission with the first endpoint 171 is finished.

When the first data transmission is executed, the first bus instance 110 determines whether the second bus instance 120 is idle (step S402). When it is determined that the second bus instance 120 is idle, the first bus instance 110 controls the second bus instance 120 to execute the second data transmission with the second endpoint 172 according to the second node 220 of the first schedule list 200 (step S403). Otherwise, when the second bus instance 120 is not idle, the first bus instance 110 does not use the second bus instance 120 to execute the second data transmission, the synchronous transmission method ends (step S404). In an embodiment, the first scheduler 111A determines whether the second direct memory access unit 122A is idle. When it is determined that the second direct memory access unit 122A is idle, the second direct memory access unit 122A is controlled to access data from the memory (not shown) according to the second node 220 of the first schedule list 200. The second protocol unit 123A is controlled to process the data into packets according to the transfer protocol of the host. The packets are transferred to the second endpoint 172 via the arbitration unit 160 and the first communication port 130. Then, the second data transmission with the second endpoint 172 is finished. The way that the synchronous transmission device 100 receives data from the first endpoint 171 and the second endpoint 172 is similar to the above way, which is not descripted again. Similarly, data transmission of the third node 230 and the fourth node 240 of the first schedule list 200 is executed by the idle second bus instance 120 to transmit data simultaneously, which is not descripted again.

When the first data is transmitted with the first endpoint 171, the first bus instance 110 uses the idle second bus instance 120 to execute the second data transmission with the second endpoint 172. Thus, the synchronous transmission is achieved. Therefore, the first data can be transmitted at the maximum speed of the first endpoint 171, and the second data can be transmitted at the maximum speed of the second endpoint 172. In an embodiment, the hub 170 is a USB 3.1 hub. Both of the first endpoint 171 and the second endpoint 172 are USB 3.0 devices. Therefore, the maximum speed of the first data transmission is 5 G bit/s, and the maximum speed of the second data transmission is 5 G bit/s.

In an embodiment, the second bus instance 120 uses the idle first bus instance 110 to execute the data transmission of the third endpoint 181 and the fourth endpoint 182 to achieve an effect of synchronous transmission.

Figure 3:
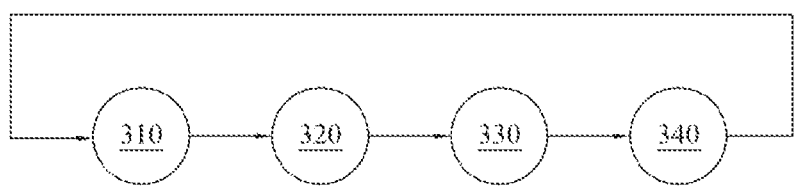
FIG. 3 is a schematic diagram of a second schedule list in an embodiment.

In the embodiment, the synchronous transmission device 100 outputs data to the third endpoint 181 and the fourth endpoint 182. Please refer to FIGS. 1 and 3. FIG. 3 is a schematic diagram of a second schedule list 300 in an embodiment of the present disclosure. The second schedule list 300 includes a first node 310, a second node 320, a third node 330 and a fourth node 340. The first node 310 and the third node 330 correspond to the third endpoint 181. The second node 320 and the fourth node 340 correspond to the fourth endpoint 182. That is, the two adjacent nodes in the second schedule list 300 correspond to different endpoints respectively. In an embodiment, the first node 310 and third node 330 represent the communication or the action with the third endpoint 181. For example, the first node 310 of the second schedule list 300 represents data transmission to the first endpoint 171 (such as a USB 3.1 device, a USB 3.0 device). The second node 320 of the second schedule list 300 represents data transmission to the fourth endpoint 182 (such as a USB 3.1 device, a USB 3.0 device), which is not limited herein. In an embodiment, the central processing unit 190 executes the firmware 151 to configure the two nodes corresponding to the third endpoint 181 and the fourth endpoint 182 adjacently to generate the second schedule list 300. As shown in FIG. 1, the third endpoint 181 and the fourth endpoint 182 correspond to different connection paths.

In an embodiment, the second communication port 140 is connected to multiple endpoints (such as the third endpoint 181 and the fourth endpoint 182, which is not limited herein). The CPU 190 executes the firmware 151 to generate the second schedule list 300 according to the endpoints. In an embodiment, the CPU 190 executes the firmware 151 to configure two nodes corresponding to two of these endpoints as adjacent nodes to generate the second schedule list 300.

In an embodiment, the second bus instance 120 executes a third data transmission with the third endpoint 181 according to the first node 310 of the second schedule list 300. That is, the third data is transferred to the third endpoint 181. In an embodiment, the second scheduler 121A controls the second direct memory access unit 122A to access data from the memory (not shown) according to the first node 310 of the second schedule list 300, and controls the second protocol unit 123A to process the data into packets according to the transfer protocol of the host. The packets are transferred to the third endpoint 181 via the arbitration unit 160 and the second communication port 140. The third data transmission with the third endpoint 171 is finished.

When the third data transmission is executed, the second bus instance 120 determines whether the first bus instance 110 is idle. When it is determined that the first bus instance 110 is idle, the second bus instance 120 controls the first bus instance 110 to execute the fourth data transmission with the fourth endpoint 182 according to the second node 320 of the second schedule list 300. Otherwise, when it is determined that the first bus instance 110 is not idle, the second bus instance 120 does not use the first bus instance 110 to execute the fourth data transmission. In an embodiment, when the third data transmission is executed, the second scheduler 121A determines whether the first direct memory access unit 112A is idle. When it is determined that the first direct memory access unit 112A is idle, the first direct memory access unit 112A is controlled to access data from the memory (not shown) according to the second node 320 of the second schedule list 300, and the first protocol unit 113A is controlled to process the data into packets according to the transfer protocol of the host. The packets are transferred to the fourth endpoint 182 via the arbitration unit 160 and the second communication port 140. Then, the fourth data transmission with the fourth endpoint 182 is finished. The way that the synchronous transmission device 100 receives data from the third endpoint 181 and the fourth endpoint 182 is similar to the above way, which is not descripted again. Similarly, data transmission of the third node 330 and the fourth node 340 of the second schedule list 300 is executed by the idle first bus instance 110 to transmit data simultaneously, which is not descripted again.

Therefore, when the third data transmission with the third endpoint 181 is executed, the second bus instance 120 uses the idle first bus instance 110 to execute the fourth data transmission with the fourth endpoint 182 to achieve a synchronous transmission effect. Therefore, the third data transmission can be executed at the maximum speed of the third endpoint 181, and the fourth data transmission can be executed at the maximum speed of the fourth endpoint 182. In an embodiment, the hub 180 is a USB 3.1 hub. Both of the third endpoint 181 and the fourth endpoint 182 are USB 3.0 devices. Therefore, the maximum speed of the third data transmission is 5 G bit/s, and the maximum speed of the fourth data transmission is 5 G bit/s.

In sum, when the data transmission of an endpoint is executed, the synchronous transmission device 100 can uses the idle bus instance to execute data transmission with another endpoint according to a schedule list. Therefore, an effect of synchronous transmission is achieved, and the efficiency of data transmission is also improved.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A synchronous transmission device, comprising
a first communication port, connected to a first endpoint and a second endpoint;
a first bus instance communicated with the first communication port, wherein the first bus instance is configured to execute a first data transmission with the first endpoint according to a first node of a first schedule list, wherein the first node of the first schedule list corresponds to the first endpoint, and the first bus instance corresponds to the first communication port; and
a second bus instance communicated with the first communication port, when the first data transmission is executed between the first bus instance and the first endpoint, the first bus instance is further configured to determine whether the second bus instance is idle, when the second bus instance is determined idle, the second bus instance is controlled to execute a second data transmission with the second endpoint according to a second node of the first schedule list such that the first bus instance executes the first data transmission with the first endpoint and the second bus instance executes the second data transmission with the second endpoint through the first communication port synchronously, and the second node of the first schedule list corresponds to the second endpoint.

2. The synchronous transmission device according to claim 1, wherein the first bus instance comprises:
a first direct memory access unit;

a first protocol unit, connected to the first direct memory access unit; and a first scheduler configured to control the first direct memory access unit and the first protocol unit to execute the first data transmission with the first endpoint according to the first node of the first schedule list.

3. The synchronous transmission device according to claim 2, wherein the second bus instance comprises:

a second direct memory access unit; and a second protocol unit, connected to the second direct memory access unit, wherein when the first data transmission is executed, the first scheduler is further configured to determine whether the second direct memory access unit is idle, and when the second direct memory access unit is determined idle, the second direct memory access unit and the second protocol unit are controlled to execute the second data transmission with the second endpoint according to the second node of the first schedule list.

4. The synchronous transmission device according to claim 1, wherein the first communication port is connected to multiple endpoints, the endpoints include the first endpoint and the second endpoint corresponding to different connection paths, and a firmware of the synchronous transmission device generates the first schedule list according to the endpoints.

5. The synchronous transmission device according to claim 4, wherein the firmware configures two nodes corresponding to two endpoints of the endpoints as adjacent nodes to generate the first schedule list, and the two endpoints correspond to different connection paths.

6. The synchronous transmission device according to claim 3, further comprising:

a second communication port connected to a third endpoint and a fourth endpoint, wherein the second bus instance is configured corresponding to the second communication port, the second bus instance is further configured to execute a third data transmission with the third endpoint according to a first node of a second schedule list, and the first node of the second schedule list corresponds to the third endpoint, when the third data transmission is executed, the second bus instance further determines whether the first bus instance is idle, when the first bus instance is determined idle, the first bus instance is controlled to execute a fourth data transmission with the fourth endpoint according to a second node of the second schedule list, and the second node of the second schedule list corresponds to the fourth endpoint.

7. The synchronous transmission device according to claim 6, wherein the second bus instance further comprises:

a second scheduler, configured to control the second direct memory access unit and the second protocol unit to execute the third data transmission with the third endpoint according to the first node of the second schedule list.

8. The synchronous transmission device according to claim 7, wherein the third data transmission is executed, the second scheduler is further configured to determine whether the first direct memory access unit is idle, and when it is determined that the first direct memory access unit is idle, the first direct memory access unit and the first protocol unit are controlled to execute the fourth data transmission with the fourth endpoint according to the second node of the second schedule list.

9. A synchronous transmission method, comprising:

executing a first data transmission with a first endpoint via a first bus instance according to a first node of a first schedule list, wherein the first node of the first schedule list corresponds to the first endpoint;

determining whether a second bus instance is idle via the first bus instance when the first data transmission is executed; and controlling the second bus instance to execute a second data transmission with a second endpoint according to a second node of the first schedule list when the second bus instance is determined idle via the first bus instance, wherein the second node of the first schedule list corresponds to the second endpoint, a first communication port is connected to the first endpoint and the second endpoint, and the first bus instance is configured corresponding to the first communication port, such that the first bus instance executes the first data transmission with the first endpoint and the second bus instance executes the second data transmission with the second endpoint through the first communication port synchronously.

10. The synchronous transmission method according to claim 9, further comprising:

configuring two nodes corresponding to two endpoints of multiple endpoints as adjacent nodes to generate the first schedule list via a firmware, wherein the first communication port is connected to the endpoints, and the two endpoints correspond to different connection paths.

* * * * *